(12) United States Patent
Pitt et al.

(10) Patent No.: US 6,650,288 B1
(45) Date of Patent: Nov. 18, 2003

(54) CULLED SATELLITE EPHEMERIS INFORMATION FOR QUICK ASSISTED GPS LOCATION DETERMINATION

(75) Inventors: Lance Douglas Pitt, Kent, WA (US); Dorothy Anne McClintock, Laurel, MD (US); Bing Long, Seattle, WA (US)

(73) Assignee: TeleCommunication Systems, Annapolis, MD (US)

( * ) Notice: Subject to any disclaimer, the term of this patent is extended or adjusted under 35 U.S.C. 154(b) by 0 days.

(21) Appl. No.: 10/238,869

(22) Filed: Sep. 11, 2002

Related U.S. Application Data
(60) Provisional application No. 60/382,367, filed on May 23, 2002.

(51) Int. Cl.[7] .............................................. H04B 7/185
(52) U.S. Cl. ............................. 342/357.15; 342/357.09
(58) Field of Search ....................... 342/357.09, 357.15

(56) References Cited

U.S. PATENT DOCUMENTS

| | | | | |
|---|---|---|---|---|
| 4,445,118 A | * | 4/1984 | Taylor et al. | 342/357.09 |
| 4,928,107 A | * | 5/1990 | Kuroda et al. | 342/357.15 |
| 6,081,229 A | * | 6/2000 | Soliman et al. | 342/357.06 |
| 6,313,786 B1 | * | 11/2001 | Sheynblat et al. | 342/357.02 |
| 6,430,504 B1 | * | 8/2002 | Gilbert et al. | 342/357.12 |
| 6,525,687 B2 | * | 2/2003 | Roy et al. | 342/357.06 |
| 6,525,688 B2 | * | 2/2003 | Chou et al. | 342/357.06 |

OTHER PUBLICATIONS

E–911 location standards and location commercial services; Wang, S.S.; Green, M.; Malkawa, M.; IEEE Emerging Technologies Symposium: Broadband, Wireless Internet Access, pp.: 1–5, 2000.*

* cited by examiner

*Primary Examiner*—Thomas H. Tarcza
*Assistant Examiner*—F H Mull
(74) *Attorney, Agent, or Firm*—William H. Bollman

(57) ABSTRACT

GPS satellites are culled into a minimum, preferred group having a longest dwell time within a cone of space, and communicated to mobile devices or subscribers within a particular region (e.g., serviced by a particular base station). The culling may initially be a list of GPS satellites visible to a particular base station at a particular time. As a preferred culling, only those GPS satellites currently within a cone of space above the relevant base station are selected for communication by a mobile device within the service area of the relevant base station. As an ultimate culling, a minimum set of GPS satellites may be selected based on, e.g., being not only within an arbitrary cone of space normal to the base station, but also projected to remain within that cone of space for the longest period of time, i.e., having the longest dwell time.

16 Claims, 6 Drawing Sheets

| GPS Satellite ID | Visible | Culled, Preferred |
|---|---|---|
| SAT. #1 | | |
| SAT. #2 | | |
| SAT. #3 | | |
| SAT. #4 | | |
| SAT. #5 | | |
| SAT. #6 | | |
| SAT. #7 | X | |
| SAT. #8 | X | |
| SAT. #9 | | X |
| SAT. #10 | | X |
| SAT. #11 | | X |
| SAT. #12 | | X |
| SAT. #13 | X | |
| SAT. #14 | X | |
| SAT. #15 | | |
| SAT. #16 | | |
| SAT. #17 | | |
| SAT. #18 | | |
| SAT. #19 | | |
| SAT. #20 | | |
| SAT. #21 | | |
| SAT. #22 | | |
| SAT. #23 | | |
| SAT. #24 | | |

Alternate Culled GPS Satellite Information culled GPS Satellite Table

| GPS Satellite ID | Visible | Culled, Preferred |
|---|---|---|
| SAT. #1 | | |
| SAT. #2 | | |
| SAT. #3 | | |
| SAT. #4 | | |
| SAT. #5 | | |
| SAT. #6 | | |
| SAT. #7 | X | |
| SAT. #8 | X | |
| SAT. #9 | | X |
| SAT. #10 | | X |
| SAT. #11 | | X |
| SAT. #12 | | X |
| SAT. #13 | X | |
| SAT. #14 | X | |
| SAT. #15 | | |
| SAT. #16 | | |
| SAT. #17 | | |
| SAT. #18 | | |
| SAT. #19 | | |
| SAT. #20 | | |
| SAT. #21 | | |
| SAT. #22 | | |
| SAT. #23 | | |
| SAT. #24 | | |

Alternate Culled GPS Satellite Information

CULLED SATELLITE EPHEMERIS INFORMATION FOR QUICK ASSISTED GPS LOCATION DETERMINATION

This applications claims priority from U.S. Provisional Application No. 60/382,367 filed May 23, 2002, to Lance Douglass Pitt, entitled "Culled Satellite Ephemeris Information For Quick Assisted GPS Location Determination", the entirety of which is explicitly incorporated herein by reference.

BACKGROUND OF THE INVENTION

1. Field of the Invention

This invention relates generally to wireles and long distance carriers, Internet service providers (ISPs), and information content delivery services/providers and long distance carriers. More particularly, it relates to location services for the wireless industry.

2. Background of Related Art

It is desired to accurately locate cell phones within a cellular network. While there are several techniques for determining location in a mobile device, a future generation of mobile phones may include a global positioning satellite (GPS) receiver chipset, thus having the ability to locate itself via GPS.

FIG. 6 depicts the conventional Global Positioning Satellite system including about 24 or more GPS satellites.

In particular, as shown in FIG. 6, the earth 200 is surrounded by approximately 24 GPS satellites 101–124, which each have their own rotational orbit about the earth 200. There are currently about 24 to 27 GPS satellites in the GPS network, each moving about the earth approximately 6 times each day.

Unfortunately, as the phone moves about the country, locations with respect to satellites change. Thus, GPS devices attempting to determine their position with respect to the earth 200 will only be able to communicate with a smaller number of the total GPS satellites at any one time.

The time required for lock in and location determination by a conventional GPS receiver in determining which of the GPS satellites in the GPS network takes several minutes, and as many as 5 or 6 minutes for a standard GPS receiver, which is longer than many if not most phone calls.

There is a need for a less cumbersome and more efficient technique for using GPS location information in a highly mobile and fast paced society.

SUMMARY OF THE INVENTION

In accordance with one aspect of the present invention, a culled satellite list comprises identification of no more than four GPS satellites within a preferred area above a particular region that a subscriber is to attempt communications with. The culled satellite list relates to GPS satellites preferred for use by subscribers within a particular region.

A method of allowing fast location determination by a mobile device in a wireless system in accordance with another aspect of the present invention comprises receiving ephemeris data regarding a GPS satellite network. A culled satellite list of no more than four GPS satellites is determined for use by mobile devices in the wireless system. The culled satellite list information is communicated to the mobile device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

In a conventional GPS system, ephemeris data is provided to each GPS receiver to keep track of where each of the satellites in the GPS satellite network should be located in space. As part of the location determination process, each GPS receiver determines which of approximately 24 or more GPS satellites are to be used to determine GPS location. This determination requires a significant amount of real-time processing at the time of the location request, and a significant amount of time.

Figure 1:
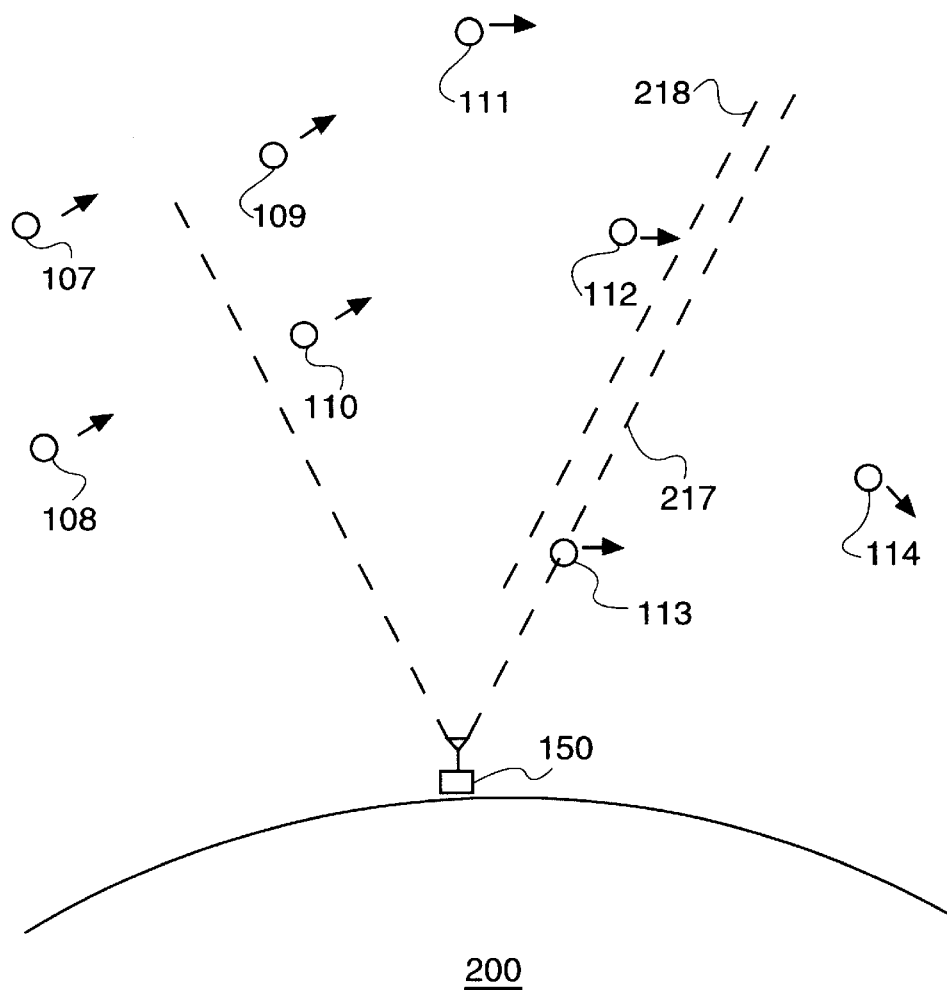
FIG. 1 shows a base station 150 of a wireless network (e.g., a cellular telephone network) determining which GPS satellites are in a preferred group, e.g., being within a cone of space with the longest dwell time within that space, in accordance with the principles of the present invention.

FIG. 1 shows a base station 150 of a wireless network (e.g., a cellular telephone network) determining which GPS satellites 101–124 are in a preferred group, e.g., being within a cone of space 217 with the longest dwell time within that space, in accordance with the principles of the present invention.

In particular, as shown in FIG. 1, of the twenty four or so GPS satellites 101–124 in the GPS system, only a sub-set 107–114 are visible to the base station 150 at any one time. Thus, based on ephemeris data, the satellites communicating with a subscriber or user within a service range of the base station 150 may be culled to only those visible, e.g., GPS satellites 107–114.

As a further culling, only those GPS satellites 109–113 currently within a cone of space 217 above the relevant base station 150 might be selected for communication with a receiver or subscriber within the service area of the relevant base station 150.

As an ultimate culling, a minimum set of GPS satellites 109–112 may be selected based on, e.g., being not only within an arbitrary cone of space 217 normal to the base station 150, but also projected to remain within that cone of space 217 for the longest period of time, i.e., having the longest dwell time. Thus, GPS satellite 113 may be eliminated or culled from the minimum set of GPS satellites as it has almost completely passed through the cone of space 217, and will have the shortest dwell time of all GPS satellites within the cone of space 217.

Ideally, the cone of space 217 will be defined sufficiently large to contain at least four GPS satellites at any one time. Alternatively, if fewer than the minimum GPS satellites are within the cone of space 217, then alternative selection criteria may be employed until sufficient number of GPS satellites enter the cone of space 217. For instance, a GPS satellite being closest to the cone of space may be utilized.

Updated ephemeris data is typically transmitted for one GPS satellite each second. Thus, for a GPS network of, e.g., 24 satellites, updated ephemeris data for all GPS satellites will have been transmitted after 24 seconds. If the network is larger, e.g., 27 GPS satellites, all ephemeris data will be transmitted after 27 seconds. Preferably, the satellites will be periodically culled in accordance with the principles of the present invention based on the provision of updated ephemeris data, e.g., once every 24 seconds, once every 27 seconds, etc.

In accordance with the principles of the present invention, the total number of available GPS satellites 101–124 is centrally culled for each service location, e.g., for each base station. The culling may be graduated, e.g., first down to those GPS satellites 107–114 that are visible, and then down to a preferred minimum group (e.g., four (4) GPS satellites) having the longest dwell time for use by the particular cell site. Of course, the culling may simply cull to a desired level (e.g., to a minimum three or four GPS satellites within the cone of space and having the longest dwell time) without graduation.

When needed, the selected GPS satellites for a particular region at any particular time of request will be passed to requesting mobile devices to help it determine its own location. For instance, each operative mobile unit is preferably periodically updated with a revised list of selected GPS satellites resulting from the culling of the GPS satellites, e.g., once after each new updated culled list of satellites is determined. The information provided to each subscriber upon request preferably contains the identity of those GPS satellites that are selected for communication. However, information provided in the reverse sense is also within the scope of the present invention (e.g., a list of GPS satellites NOT to communicate with).

A wireless network may generate a flush of updated culled GPS satellite information periodically, e.g., every 24 seconds. Note that based on the positions of the various GPS satellites 101–124, and in particular based on the positions of the selected GPS satellites 109–112 within the cone of space 217, the list of selected GPS satellites may or may not change.

Preferably, network traffic will be minimized by reducing or eliminating redundant GPS satellite information. Thus, in a preferred embodiment, GPS satellite list updating messages are sent only when a change in the list has occurred.

Figure 2:
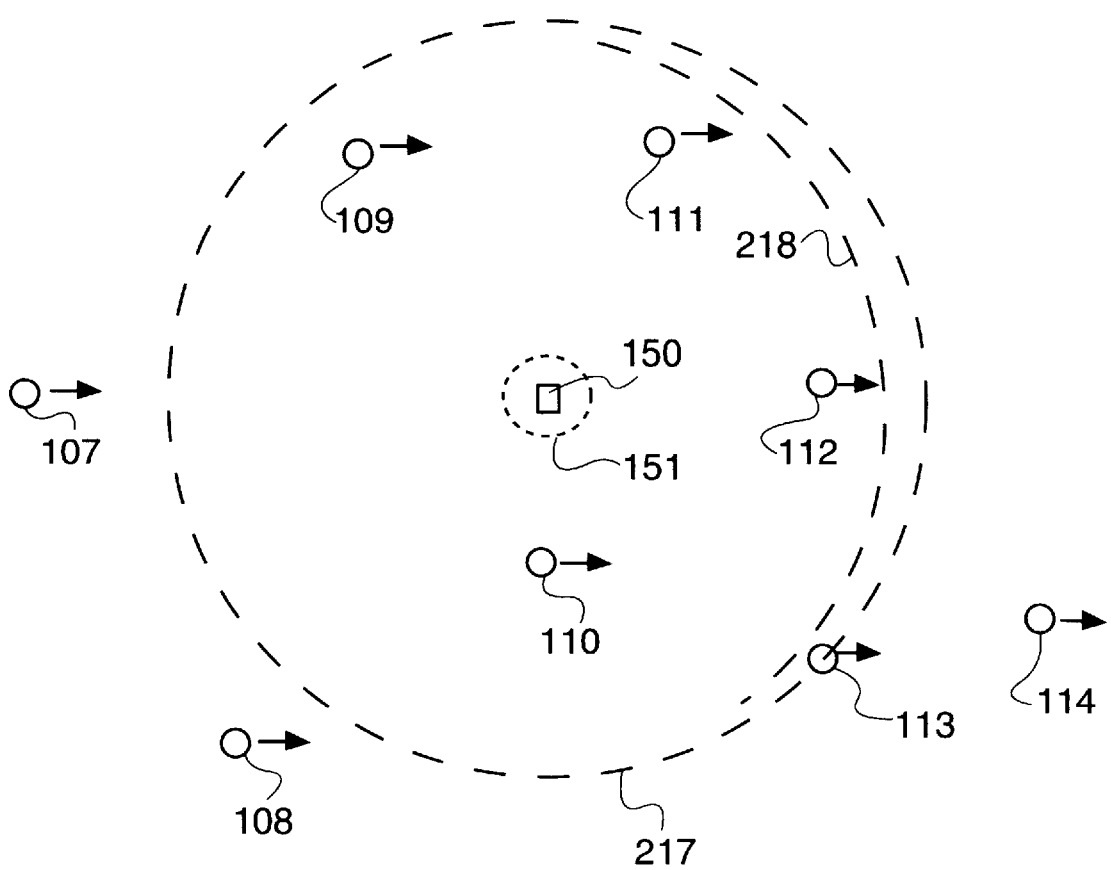
FIG. 2 shows a top view of the cone of space as shown in FIG. 1.

FIG. 2 shows a top view of the cone of space 217 as shown in FIG. 1.

In particular, as shown in FIG. 2, a cone of space 217 is viewed from space normal to a base station 150. On the ground, the base station 150 has a service region 151. The circular representation of the cone represents a plane cut across the cone of space 217.

Within the cone of space 217, GPS satellites 101–124 generally travel from one side to the other. Dwell time is determined based on a distance between the present location of the particular GPS satellite, and the exit edge of the cone of space 217, as well as the rate of speed of the GPS satellite.

A minimum dwell time may be defined and represented as a edge 218 shown in FIGS. 1 and 2.

A satellite velocity vector may be determined or predetermined. Satellite velocity vector as used herein refers to a vector whose magnitude is the velocity of the satellite and whose origin is the satellite's current position.

To obtain any particular GPS satellite's velocity vector, if the satellite is inside the cone of space 217, then it is in a plane (some plane) that is perpendicular to a longitudinal axis of the cone 217. The particular GPS satellite's velocity vector can be projected into a circle defined by the planar intersection of the GPS satellite and the cone 217. The plane depicted in FIG. 2 may represent the plane of one or more or all GPS satellites 101–124.

This projection will lie on a chord that cuts across the circle. If the length of the chord is computed, together with use of the GPS satellite's current position on the chord and the magnitude of the projection can be used to get a rough indication of how long the GPS satellite will be within the cone of visibility.

In accordance with the principles of the present invention, a small group of, e.g., four (4) GPS satellites with the longest "cone" dwell times will be selected, and most or all others are preferably "culled". The longest dwell time relates to the amount of time that a calculated GPS satellite vector will be within a respective cone of space 217 above a particular region of users, e.g., above a particular base station 150.

The cone of space 217 may be simply a cone of visibility above the base station 150, or may be more narrowly defined than visibility.

The resultant list of selected GPS satellites is preferably periodically and continually updated for any particular location, e.g., base station 150, as the GPS satellites 101–124 rotate about the earth. Updated selected GPS satellite lists are preferably communicated to the mobile subscriber base station 150 (or other suitable application location) for their respective calculations of accurate location information. With the use of selected GPS satellites only by culling out unnecessary or unseen GPS satellites, the total time required for a mobile phone to locate itself can be reduced significantly, e.g., from minutes to just seconds.

Figure 3:
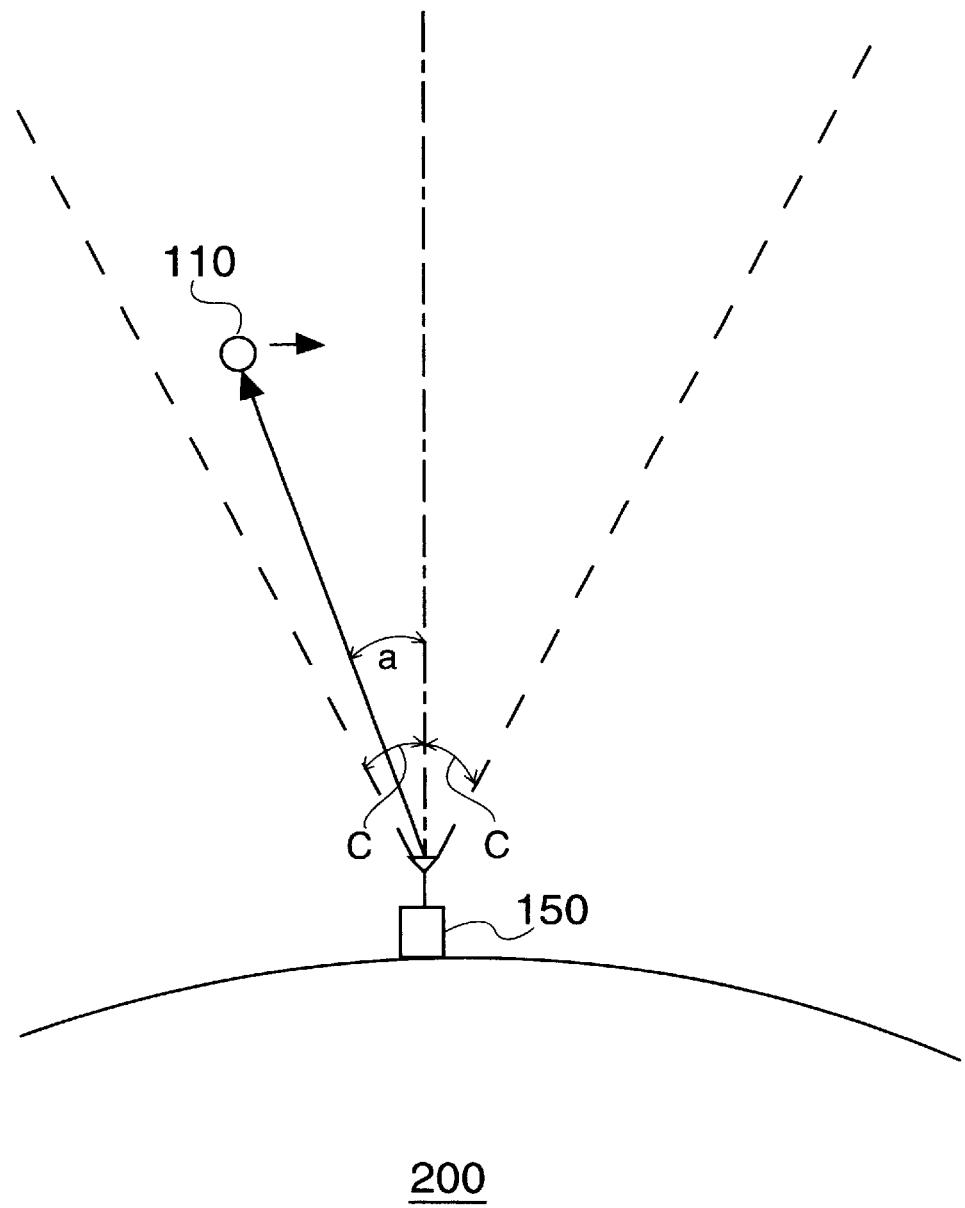
FIG. 3 shows vector calculations for each GPS satellite, or for each of a preferred set of GPS satellites (e.g., those visible to the base station), in accordance with the principles of the present invention.

FIG. 3 shows vector calculations for each GPS satellite 101–124, or for each of a preferred set of GPS satellites (e.g., those visible to the base station), in accordance with the principles of the present invention.

In particular, as shown in FIG. 3, conventional GPS ephemeris data is formatted as RINEX 2.10 data, which is provided by conventional GPS ephemeris data vendors to an XLP. In accordance with the principles of the present invention, received RINEX data is converted into an Earth Center position vector (i.e., a vector pointing to the satellite's current position whose origin is the center of the Earth). Then, using the Earth Center position vectors, the available GPS satellites are culled such that only desired GPS satellites are communicated with (i.e., those that will be in the cone of space 217 until the next culled update, e.g., 24 seconds later).

In the disclosed embodiments, an Earth Center position vector is computed (or pre-computed) for every cell site 150 in H3G's network. The cell site's EC position vector can be subtracted from the GPS satellite's EC position vector to arrive at a vector that points from the cell site 150 to the particular GPS satellite 101–124. The resulting vector can be divided by its own magnitude to generate a unit vector that points from cell site 150 toward the particular GPS satellite 101–124. The cell site's EC position vector can similarly be divided by its own magnitude to generate a unit vector that points straight up from the cell site 150 (also pre-computed).

The dot product of the GPS satellite pointing unit vector and the vertical unit vector yields the cosine of the angle between the two vectors. The cosine of an angle of zero degrees yields the value 1.0. The resulting value of the equation "cosine (angle)" diminishes as the angle grows until the cosine of 90 degrees yields the value 0.0. The cosine of angles greater than 90 degrees yield negative results. This makes the cosine of the angle between the satellite pointing unit vector and the vertical unit vector particularly well suited for identifying whether or not the satellite is "visible". An angular measurement defining a cone of space above the cell site (e.g., a "cone of visibility") can be pre-selected and the cosine of the pre-selected value saved. Any satellite whose dot product with the vertical unit vector yields a value greater than or equal to the precomputed reference value can then be considered "visible".

Thus, a rough culling of GPS satellites 101–124, e.g., to only those visible, or even better yet to only those most normal to a base station 150, certainly culling out all GPS satellites that aren't visible at all, and reducing the number of GPS satellites to communicate with to a minimum number (e.g., to four to get elevation data, or to only three to get location data).

Figure 4:
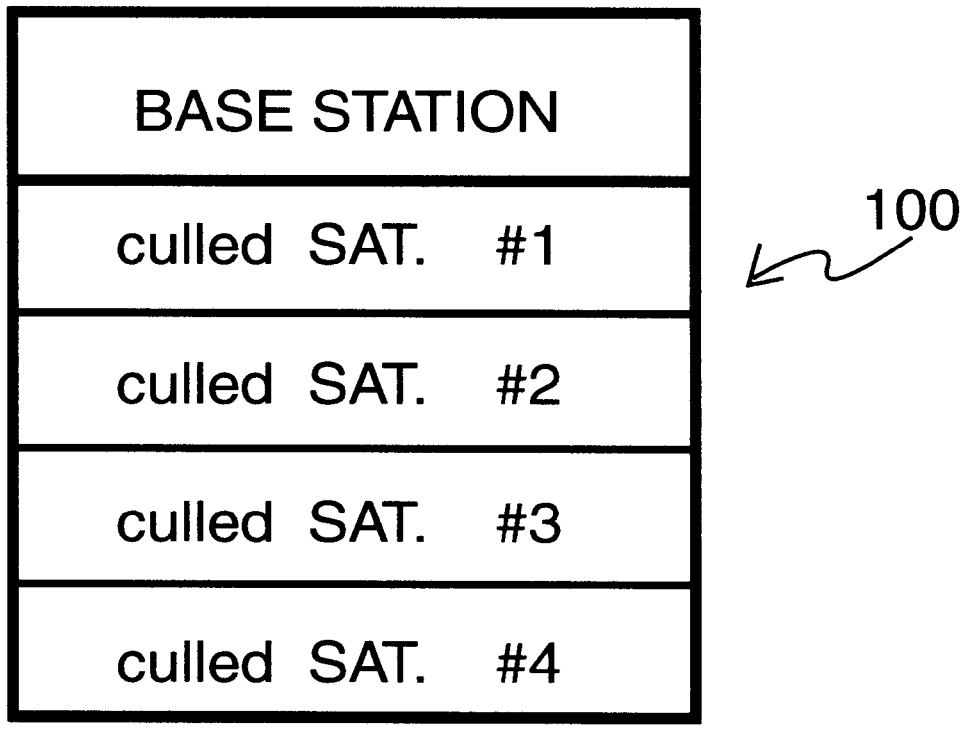
FIG. 4 shows an exemplary culled GPS satellite table, in accordance with the principles of the present invention.

FIG. 4 shows an exemplary culled GPS satellite table 100, in accordance with the principles of the present invention.

In particular, as shown in FIG. 4, the selected group of satellites, e.g., four satellites for any particular cell site may be maintained in a suitable database and/or other table 100, which may then be provided upon request to any particular mobile device within the service area of that particular cell site 150.

Thus, a small subgroup of, e.g., four GPS satellites having the longest dwell time with respect to a servicing cell site 150 are selected, and maintained in a culled satellite table 100 communicated to all active mobile subscribers (or other grouping of mobile users). Moreover, or alternatively, whenever a mobile device requires ephemeris data, it may request an update to a culled satellite table 100 containing the identity of the desired four satellites with which to use to determine location of the mobile device.

Figure 5:
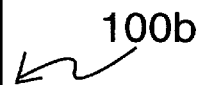
FIG. 5 shows an alternate exemplary culled GPS satellite information table, in accordance with the principles of the present invention.
Figure 6:
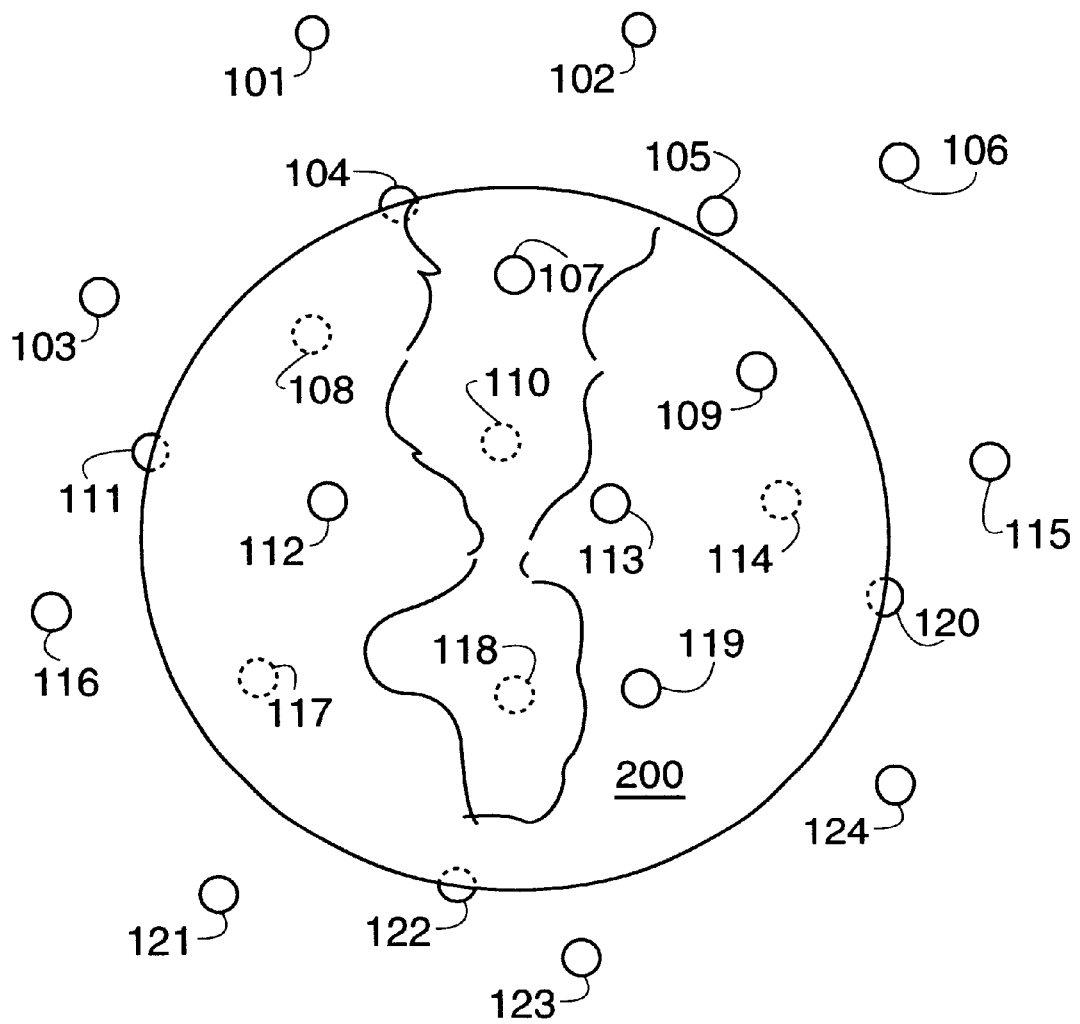
FIG. 6 depicts the conventional Global Positioning Satellite system including about 24 or more GPS satellites.

FIG. 5 shows an alternate example of a selected or culled GPS satellite information table, in accordance with the principles of the present invention.

In particular, as shown in FIG. 5, a database or table 100b may include information regarding all or most GPS satellites 101–124, with those that are selected for any particular base station 150 being appropriately indicated.

While the present invention is explained with reference to the use of as many as 24 or 27 available GPS satellites 101–124, the present invention relates to the use of any number of GPS satellites greater than four (4).

Moreover, while the present invention provides culling of visible satellites, and even to a minimum number of satellites, e.g., down to four from those visible satellites, the resultant number of satellites may be a number greater than or even less than 4, within the principles of the present invention. For instance, if only position is required, only three (3) GPS satellites are required. However, if altitude is also required, four (4) GPS satellites are the minimum required and thus the maximum culling level. Moreover, the use of more than approximately six (6) GPS satellites do not significantly improve the accuracy of the results.

If a subscriber is unable for some reason to communicate with one or more GPS satellites directed by the culled GPS satellite table or similar information, the subscriber may then attempt to achieve location information in an otherwise conventional manner, e.g., by attempting contact with all GPS satellites.

While the invention has been described with reference to the exemplary embodiments thereof, those skilled in the art will be able to make various modifications to the described embodiments of the invention without departing from the true spirit and scope of the invention.

What is claimed is:

1. A culled satellite list, comprising:
   identification information of no more than four GPS satellites within a preferred area above a particular region that a subscriber is to attempt communications with culled from a larger group of GPS satellites through vector projection;
   wherein said culled satellite list relates to GPS satellites preferred for use by subscribers within a particular region.

2. The culled satellite list according to claim 1, wherein:
   said area above said particular region is defined having a cone shape.

3. A method of assisting GPS location determination by a mobile device in a wireless system, comprising:
   receiving ephemeris data regarding a GPS satellite network;
   determining a culled satellite list of no more than four GPS satellites culled from a larger group of GPS satellites through vector projection for use by mobile devices in said wireless communication system; and
   communicating said culled satellite list to said mobile device.

4. The method of assisting GPS location determination by a mobile device in a wireless system according to claim 3, further comprising:
   periodically updating said culled satellite list.

5. The method of assisting GPS location determination by a mobile device in a wireless system according to claim 4, wherein:
   said culled satellite list is revised in a central location with respect to mobile devices in said wireless system.

6. The method of assisting GPS location determination by a mobile device in a wireless system according to claim 3, further comprising:
   providing said culled satellite list to mobile devices in said wireless system only when said culled satellite list changes.

7. The method of assisting GPS location determination by a mobile device in a wireless system according to claim 3, wherein:
   said wireless system is a cellular telephone system.

8. The method of assisting GPS location determination by a mobile device in a wireless system according to claim 3, wherein said determining comprises:
   determining a vector to each available GPS satellite from a particular region point of reference; and
   selecting only those GPS satellites most desirable for communications with mobile devices in said wireless system.

9. The method of assisting GPS location determination by a mobile device in a wireless system according to claim 8, wherein said determining further comprises:
   culling based on a longest dwell time within a given region of a plane above said point of reference.

10. Apparatus for assisting GPS location determination by a mobile device in a wireless system, comprising:
    means for receiving ephemeris data regarding a GPS satellite network;
    means for determining a culled satellite list of no more than four GPS satellites culled from a larger group of GPS satellites through vector projection for use by mobile devices in said wireless communication system; and means for communicating said culled satellite list to said mobile device.

11. The apparatus for assisting GPS location determination by a mobile device in a wireless system according to claim 10, further comprising:

means for periodically updating said culled satellite list.

12. The apparatus for assisting GPS location determination by a mobile device in a wireless system according to claim 11, wherein:

said culled satellite list is revised in a central location with respect to mobile devices in said wireless system.

13. The apparatus for assisting GPS location determination by a mobile device in a wireless system according to claim 10, further comprising:

means for providing said culled satellite list to mobile devices in said wireless system only when said culled satellite list changes.

14. The apparatus for assisting GPS location determination by a mobile device in a wireless system according to claim 10, wherein:

said wireless system is a cellular telephone system.

15. The apparatus for assisting GPS location determination by a mobile device in a wireless system according to claim 10, wherein said means for determining comprises:

means for determining a vector to each available GPS satellite from a particular region point of reference; and means for selecting only those GPS satellites most desirable for communications with mobile devices in said wireless system.

16. The apparatus for assisting GPS location determination by a mobile device in a wireless system according to claim 15, wherein said means for determining further comprises:

means for culling based on a longest dwell time within a given region of a plane above said point of reference.

* * * * *